(12) United States Patent
Goertz et al.

(10) Patent No.: US 10,228,477 B2
(45) Date of Patent: Mar. 12, 2019

(54) METHOD AND SYSTEM OF CALCULATING HYPOCENTERS OF MICROSEISMIC EVENTS

(71) Applicant: PGS Geophysical AS, Oslo (NO)

(72) Inventors: Alexander V. Goertz, Kjeller (NO); Joseph Richardson, Barra de Tijuca (BR)

(73) Assignee: PGS Geophysical AS, Oslo (NO)

( * ) Notice: Subject to any disclaimer, the term of this patent is extended or adjusted under 35 U.S.C. 154(b) by 564 days.

(21) Appl. No.: 14/602,429

(22) Filed: Jan. 22, 2015

(65) Prior Publication Data

US 2016/0109590 A1    Apr. 21, 2016

Related U.S. Application Data

(60) Provisional application No. 62/065,187, filed on Oct. 17, 2014.

(51) Int. Cl.
*G01V 1/28* (2006.01)
*G01V 1/38* (2006.01)

(52) U.S. Cl.
CPC .............. *G01V 1/288* (2013.01); *G01V 1/28* (2013.01); *G01V 1/38* (2013.01); *G01V 2210/1427* (2013.01)

(58) Field of Classification Search
CPC . G01V 1/288; G01V 1/38; G01V 1/28; G01V 1/201; G01V 1/3808; G01V 2210/56; G01V 2210/1234; G01V 2210/65

USPC ........................................................... 702/14
See application file for complete search history.

(56) References Cited

U.S. PATENT DOCUMENTS

| 7,359,283 B2 | 4/2008 | Vaage et al. | |
| 2010/0091610 A1* | 4/2010 | Sollner | G01V 1/38 367/24 |
| 2013/0265851 A1* | 10/2013 | Faber | G01V 1/42 367/25 |

OTHER PUBLICATIONS

Lowenthal, "On dual field measurements using geohydrophones" 64th Annual Meeting, SEG, 1994, pp. 861-864.
Barr, et al. "Attenuation of water-column reverberations using pressure and velocity detectors in water-bottom cables" 59 Annual International Meeting, SEG, 1989, pp. 653-656.

* cited by examiner

*Primary Examiner* — Gregory J Toatley, Jr.
*Assistant Examiner* — Lynda Dinh

(57) ABSTRACT

Calculating hypocenters of microseismic events. At least some of the example embodiments are methods including: detecting seismic waves from a microseismic event, the detecting by a sensor array disposed on a seafloor, the microseismic event originating in a formation below the sensor array, and the detecting creates received data; separating the received data into up-going data and down-going data, the down-going data indicative of detected seismic waves after a first reflection of the seismic waves at a sea surface; and calculating a hypocenter of the microseismic event using both the up-going data and the first down-going data.

15 Claims, 6 Drawing Sheets

METHOD AND SYSTEM OF CALCULATING HYPOCENTERS OF MICROSEISMIC EVENTS

CROSS-REFERENCE TO RELATED APPLICATIONS

This application claims the benefit of U.S. Provisional Application Ser. No. 62/065,187 filed Oct. 17, 2014 and titled "Using Multiple Arrivals for the Location of Reservoir Microseismicity". The provisional application is incorporated by reference herein as if reproduced in full below.

BACKGROUND

In seismic exploration of formations below bodies of water, such as a lake or ocean, in some cases an acoustic source is used to create the interrogating energy. In particular, the acoustic source is suspended in the water at a known depth and the acoustic source is activated at known times. The acoustic energy propagates through the water, into the formation below the sea floor, and a portion of the acoustic energy is reflected and propagates back for detection. Based on the known activation time of the acoustic source, the known velocity of the acoustic signal in the water, and a velocity model of the formation layers below the sea floor, the depth of the various acoustic reflectors can be determined with relatively good accuracy.

However, in the realm of microseismics, small movements of rock or pore fluid (e.g., small underground earthquakes) are the source of acoustic energy rather than man-made acoustic energy, and location of the microseismic event may be the parameter of interest. An issue in microseismics is the ambiguity between the location of the microseismic event and the time of occurrence of the microseismic event. That is, in an attempt to resolve the location of the microseismic event, a range of valid solutions may exist along a spectrum of from earlier in time and shallower to later in time and deeper.

BRIEF DESCRIPTION OF THE DRAWINGS

For a detailed description of exemplary embodiments, reference will now be made to the accompanying drawings, which are not necessary to scale.

DEFINITIONS

Figure 1:
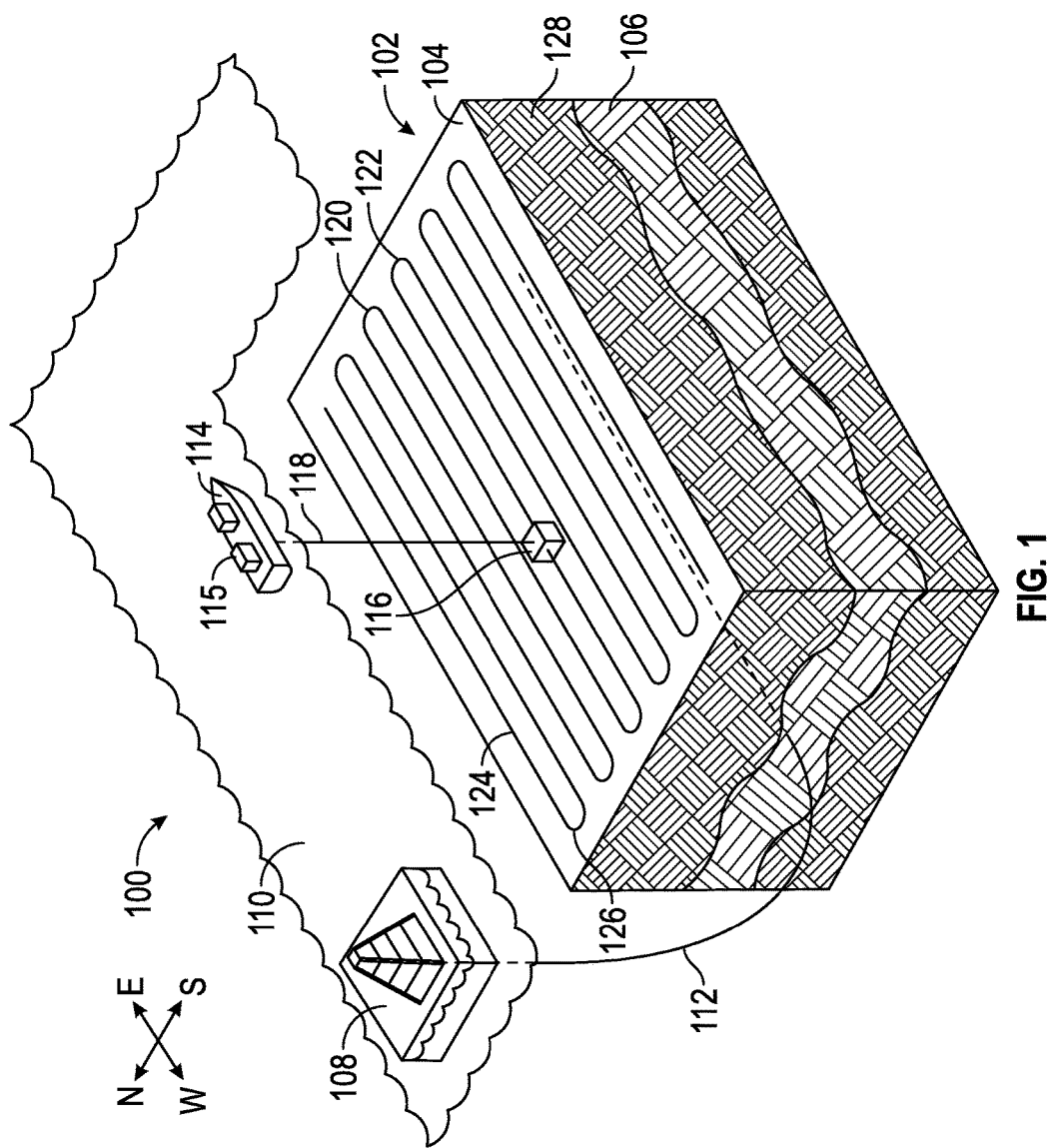
FIG. 1 shows a perspective cut-away view of a system in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus shall be interpreted to mean "including, but not limited to . . . " Also, the term "couple" or "couples" shall mean either an indirect or direct connection. Thus, if a first device couples to a second device, that connection may be through a direct connection or through an indirect connection via other devices and connections.

"Hypocenter" shall mean the location of a microseismic event, and shall include a horizontal location and a depth within the earth. "Epicenter" shall mean the projection of the hypocenter onto a horizontal plane such as the surface of the earth or the seafloor, and thus epicenter does not imply a depth.

"Microseismic event" shall mean movement of rock or fluid within a formation which creates seismic waves.

"Seafloor" shall mean the interface between a body of water and the underlying rock or sediment. "Seafloor" shall not require salt water overlaying the seafloor, and thus fresh water and brackish water bodies shall have a seafloor.

"Sea surface" shall mean the interface between a body of water and overlying air. "Sea surface" shall not require salt water at the water-air boundary, and thus fresh water and brackish water bodies shall have a sea surface.

"Up-going data" shall mean data regarding seismic waves that were upward traveling at the location of the sensors at the time of detection.

"Down-going data" shall mean data regarding seismic waves that were downward travelling at the location of the sensors at the time of detection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

The various embodiments are directed to methods and related systems of determining the origin location or hypocenter of microseismic events. In some example systems the microseismic events are caused by hydraulic fracturing of an underground formation, where the hypocenters may be indicative of the spatial extent of the fracturing, and thus useful in determining the stimulated reservoir volume. In other example systems the microseismic events may be caused by extraction of hydrocarbons from the formation, and thus the hypocenters of the microseismic events may be indicative of quality and extent of the extraction from the formation. In yet still other example systems the microseismic events may be naturally occurring seismic events.

Regardless of the end-use, calculating the hypocenter of the microseismic events is made using both the detected energy associated with the upward travelling seismic waves of the microseismic event, as well as detected energy of the downward travelling seismic waves after reflection at the sea surface (the downward travelling seismic waves sometimes referred to as the "surface ghost" or a "multiple"). Using the surface ghost effectively increases the aperture of the ocean bottom installation which leads to a reduction in depth uncertainty. The specification first turns to an example system to orient the reader.

FIG. 1 shows a perspective, partial cut-away, view of a system in accordance with at least some embodiments. In particular, FIG. 1 shows seismic monitoring system 100 comprising a sensor array 102 residing on the seafloor 104. Below the sensor array 102 and seafloor 104 is a hydrocarbon formation 106. The example seismic monitoring system 100 is also associated with a drilling platform 108 at the sea surface 110, and the drilling platform is associated with a borehole 112 that extends through the water and into the hydrocarbon formation 106. Also associated with the sensor array 102 is a surface vessel 114 communicatively coupled to the sensor array 102 by way of a central hub 116 and riser cable 118. In the example system, the surface vessel has monitoring equipment 115 (e.g., one or more computer systems with large data storage) that reads data from sensors in the sensor array 102; however, in other cases the sensor array 102 may be communicatively coupled to monitoring equipment on the shore (not specifically shown) by way of a cable, and thus having a surface vessel 114 coupled to the sensor array 102 is not strictly required. In yet still other cases, the sensor array 102 may communicatively couple to the drilling platform 108 rather than the surface vessel 114 or the shore-based monitoring system.

In the example seismic monitoring system of FIG. 1 the sensor array 102 is illustratively shown as two sensor cables 120 and 122 coupled to the central hub 116; however, one or more sensor cables may be used. Each example sensor cable 120, 122 comprises a suitable number of sensors (not specifically shown) spaced along the sensor cable. In one example system, each sensor cable comprises over several hundred sensors with each sensor being the combination of a hydrophone and one or more particle motion detectors (such as geophones or accelerometers). In the example system shown, the sensor cables are laid out in East-West runs, such as portion 124 of sensor cable 120, where the East-West runs loop around (such as loop 126) to form the next East-West run, with about 300 meters of separation (measured North-to-South) between the East-West runs. The East-West orientation is merely illustratively and any orientation of the sensor array 102 is possible.

The sensor array 102 and related monitoring equipment 115 may be part of a Permanent Reservoir Monitoring (PRM) system which enables time-lapse seismic monitoring of the hydrocarbon reservoir 106 (that is, enables determining multiple three-dimensional seismic images taken over a period of time), to capture time-variant changes in the reservoir 106. Thus, in some cases the sensor array 102 is used in combination with a seismic source (not specifically shown) that is towed within the water over the sensor array 102 and periodically fired. When using the seismic source, the acoustic energy created propagates into the overburden 128 and down to the hydrocarbon formation 106, and portions of the acoustic energy are reflected back to and sensed by the sensors of the sensor array 102. However, the sensor array 102 may also be used to detect microseismic events in the earth formations below the sensor array 102, such as microseismic events associated with drilling the borehole 112, hydraulically fracturing the hydrocarbon formation 106 through the borehole, or fluid injection or extraction through the borehole 112. As will be discussed in greater detail below, the microseismic events associated with hydraulic fracturing operations may be used to determine the quality and physical extent of the hydraulic fracturing operations, and perhaps even to assist the hydraulic fracturing operations by supplying information that results in modifying parameters of the hydraulic fracturing operation (e.g., pressure applied, length of time pressure is applied, volume of fluids pumped into the borehole).

Figure 2:
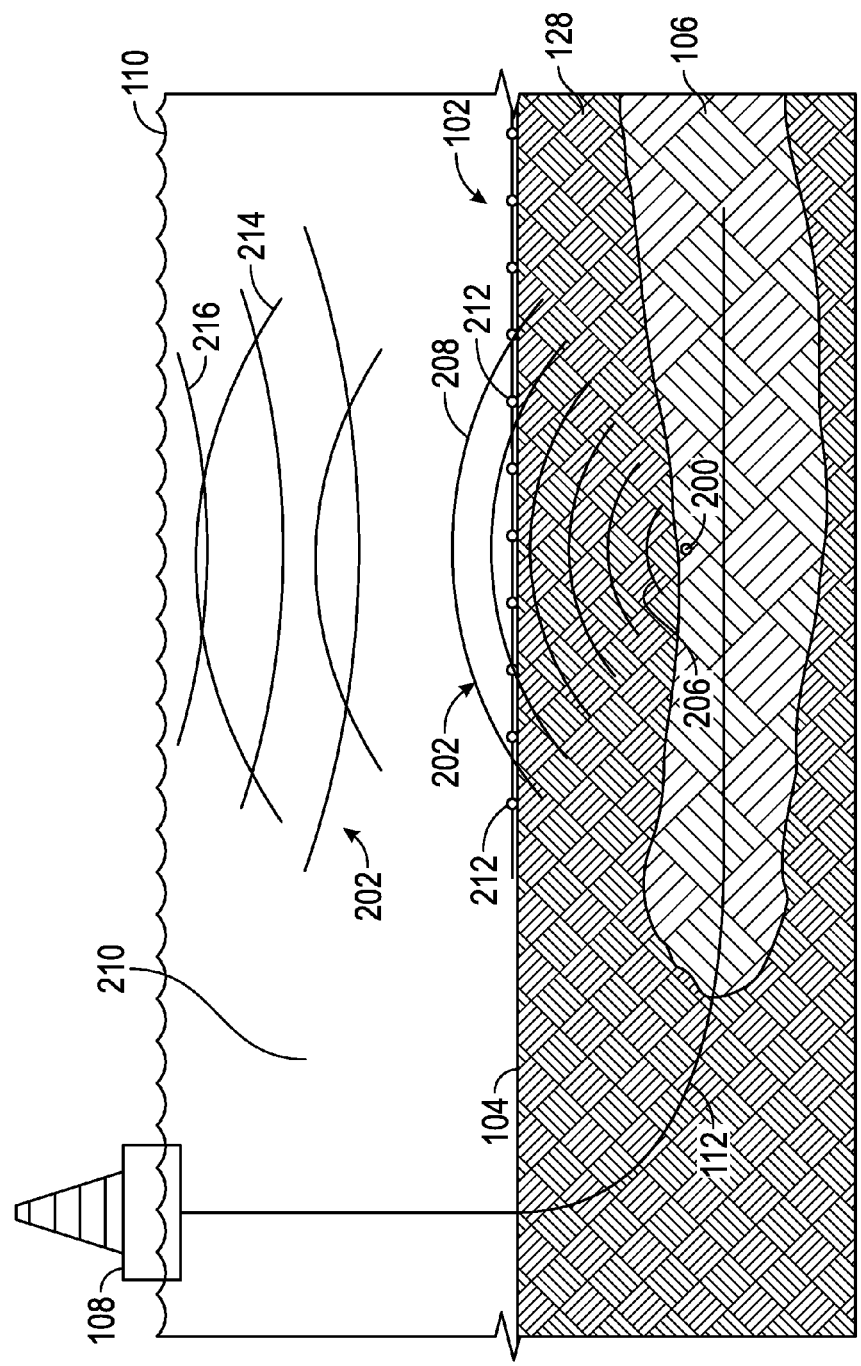
FIG. 2 shows a cut-away side elevation view in accordance with at least some embodiments.

FIG. 2 shows a side elevation cut-away view of the seismic monitoring system 100 of FIG. 1 to develop additional concepts. In particular, visible in FIG. 2 are the hydrocarbon formation 106, the overburden 128, a portion of the sensor array 102, the seafloor 104, the borehole 112, the sea surface 110, and the drilling platform 108. The surface vessel, riser cable, and central hub are omitted so as not to obscure other features of the figure. For purposes of explanation, the microseismic events discussed are microseismic events associated with drilling and hydraulic fracturing operations; however, the various example methods and systems of calculating a hypocenter of a microseismic event are not limited to just microseismic events associated with drilling and hydraulic fracturing. Similarly, microseismic events associated with hydrocarbon extraction or water injection can be used to determine the quality and physical extent of the exploitation operation, and may supply information that lead to a modification of the exploitation parameters.

Consider that during a hydraulic fracturing operation the pressure and/or fluid flow causes a microseismic event having a hypocenter 200. For example, the hydraulic fracturing operation may cause rock of the hydrocarbon formation 106 to fracture at the location of the hypocenter 200, thus causing seismic waves to propagate outward spherically. In the side elevation view of FIG. 2, the spherical seismic waves would appear circular, but only the portion of the seismic waves traveling upward from the hypocenter 200 are shown and labeled as seismic waves 202. More particular, the open-bottomed parabolic lines (e.g., lines 206 and 208) representing the seismic waves 202 may be conceptually considered to be the wave front of the seismic waves 202 at different points in time. Thus parabolic line 206 may represent the wave front of the seismic waves 202 just after the seismic event at the hypocenter 200, and parabolic line 208 may represent the wave front of the seismic waves 202 as the wave front transitions from the overburden 128 to the water 210 and impinges on the sensor array 102 disposed on the seafloor 104. As the seismic waves 202 pass the sensor array 102, the sensors 212 detect the seismic wave 202 and created data, in this case regarding the upward traveling seismic waves.

Still referring to FIG. 2, the seismic waves 202 continue past the sensor array 102 and reflect at the sea surface 110. For example, parabolic line 214 represents the wave front of the seismic waves 202 just prior to reflection at the sea surface 110, and parabolic line 216 represents the wave front after reflection at the sea surface 110. The reflected seismic waves 202 then propagate downwardly, eventually impinging on the sensor array 102 disposed on the seafloor 104. As the downward travelling seismic waves pass, represented by parabolic line 216, the sensor array 102, the sensors 212 detect the seismic waves and create further data, in this case regarding the reflected and downward traveling seismic waves. The data regarding the downward travelling seismic waves may be referred to as the surface ghost or a multiple (here the first multiple). Though not specifically shown, a portion the downward traveling seismic waves 202 is reflected at the seafloor 104, again propagates to the sea surface 110, again reflects at the sea surface 110, and eventually again impinges on the sensor array 102 (and may be referred to as a second multiple).

Thus, each time the wave front passes the sensor array 102, the sensors 212 create data. In particular, sensor array 102 detects seismic waves from the seismic event at the example hypocenter 200 below the sensor array 102, and the detection creates received data. Because each sensor 212 is the combination of a hydrophone and one or more particle motion detectors (e.g., geophones or accelerometers), the received data takes several forms. Consider first the upward travelling seismic waves 202 represented by parabolic lines 206 and 208. As the upward traveling seismic waves 202 pass the sensor array 102, the hydrophone of each sensor 212 records fluctuations in pressure. Likewise, as the upward traveling seismic waves 202 pass the sensor array 102, the particle motion detector of each sensor detects particle motion associated with the seismic waves. Now consider the downward travelling seismic waves 202 represented by parabolic line 216 (and others not specifically numbered). As the downward traveling seismic waves 202 again pass the sensor array 102, the hydrophone of each sensor 212 records fluctuations in pressure. Likewise, as the downward traveling seismic waves 202 pass the sensor array 102, the particle motion detector of each sensor detects particle motion associated with the seismic waves.

Figure 3:
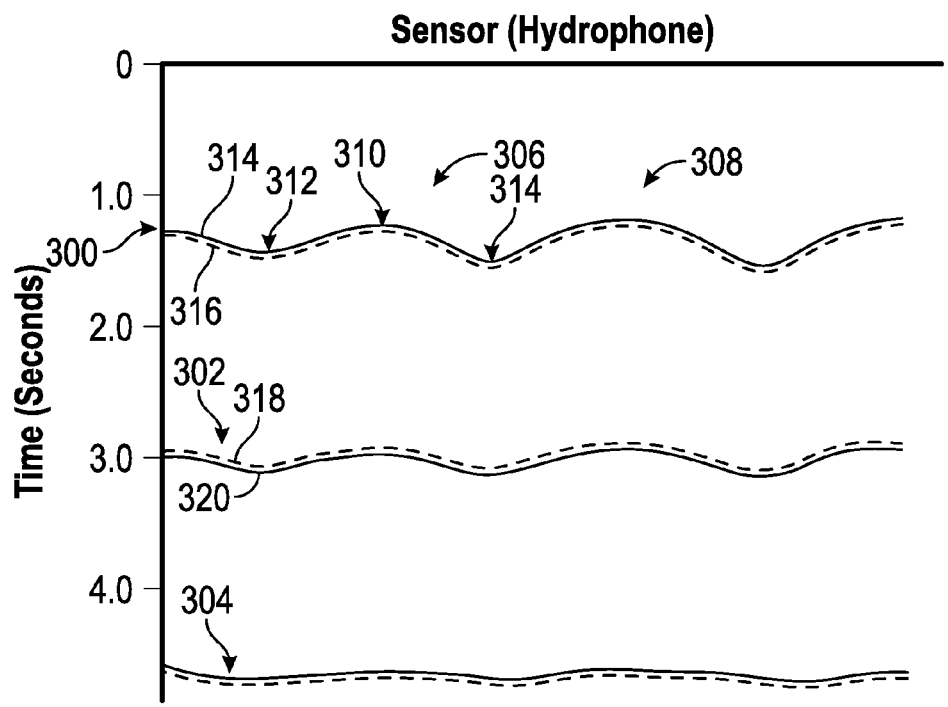
FIG. 3 shows a plot of seismic arrivals in accordance with at least some embodiments.

FIG. 3 shows an example plot of data received by sensor array 102 associated with the microseismic event. In particular, FIG. 3 plots hydrophone sensor response by sensor (the upper horizontal axis) against time (left vertical axis). The upper horizontal axis represents each sensor along the sensor array (e.g., sensor cable 122 starting at the central hub 116 and extending to the distal end), and the vertical axis represents time starting at an arbitrary time zero in the upper left hand corner and extending downward. In many seismic plots, the magnitude of the sensed pressure is encoded in color within the graph (e.g., with blue representing positive fluctuations from ambient pressure, and red representing negative fluctuations from ambient pressure). In the plot of FIG. 3, positive pressure fluctuations are shown in solid lines, and negative pressure fluctuations are shown as dashed lines. It is noted that the FIG. 3 is simplified in the sense that only the most prominent features of the sensed data are shown so as not to unduly complicate the figure.

The plot of FIG. 3, which visually represents a portion of the received data created by a sensor array 102, shows three prominent features: the arrival of the upward travelling seismic waves 202 at arrival 300; the arrival of the downward travelling seismic waves associated with the first multiple at arrival 302; and the arrival associated with downward travelling seismic waves of the second multiple at arrival 304. Consider now the first arrival 300, which has several parabolic features, such as parabolic features 306 and 308. The upper inflection point 310 of parabolic feature 306 represents data of sensors closest to the example hypocenter 200 (FIG. 2), while the lower inflection points 312 and 314 represent data of sensors farthest from the hypocenter. Thus, the plot of FIG. 3 shows that the sensors closest to the hypocenter detect the seismic waves before the sensors at the more distant locations. Parabolic feature 306 thus represents the response of a portion of the sensor array (e.g., one East-West run), while parabolic feature 308 represents the response of another portion of the sensor array (e.g., the adjacent East-West run of the sensor array). The explanation of the relationship of the parabolic features is equally applicable to the arrival 302 and arrival 304.

As mentioned above, the plot of FIG. 3 shows positive pressure fluctuations as shown in solid lines, and negative pressure fluctuations as dashed lines. For the example underlying data, the first arrival 300 was a positive pressure fluctuation (shown by solid line 314) followed by a negative fluctuation (shown by dashed line 316). In most cases the seismic waves would cause several additional fluctuations around the ambient pressure over time, but the follow-on pressure fluctuations are not shown. In the example set of data plotted in FIG. 3, the first fluctuation was positive, but depending on the microseismic event, the first pressure fluctuation could instead be a negative. In the second arrival 302, the first pressure fluctuation is negative (shown by dashed line 318) followed by a positive pressure fluctuation (shown by solid line 320). The reflection at the sea surface results in a polarity change of the reflected wave. Finally, arrival 304 represents the second multiple (after a second reflection at the sea surface), and thus the polarity of the wave front is the same as the first arrival 300.

Figure 4:
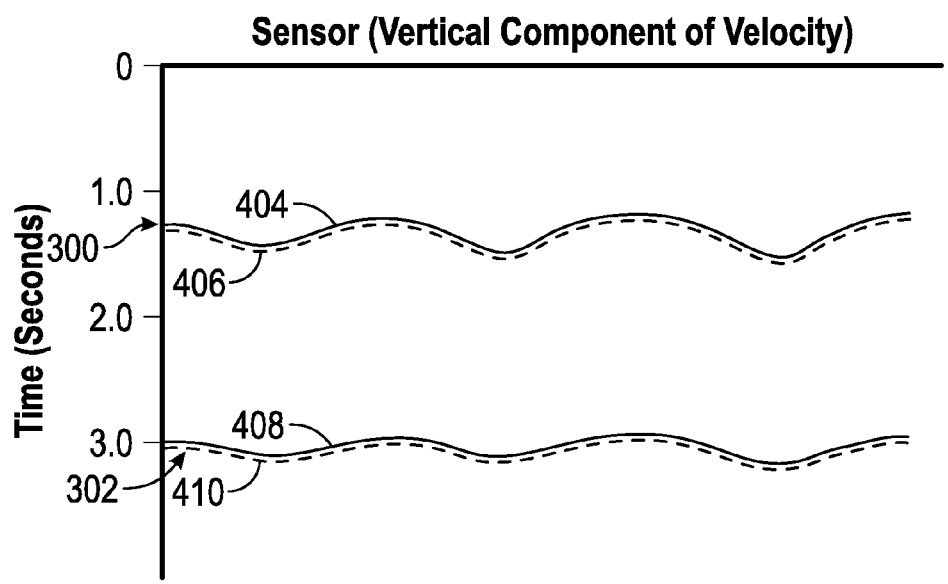
FIG. 4 shows a plot of seismic arrivals in accordance with at least some embodiments.

FIG. 4 shows an example plot of data received by sensor array 102 associated with the microseismic event. In particular, FIG. 4 plots the vertical component of the velocity by sensor (the upper horizontal axis) against time (left vertical axis). The upper horizontal axis represents each particle motion sensor along the sensor array (e.g., sensor cable 122 starting at the central hub 116 and extending to the distal end), and the vertical axis represents time starting at an arbitrary time zero in the upper left hand corner (being the same as time zero in FIG. 3) and extending downward. In many seismic plots, the magnitude of the vertical component of the velocity is encoded in color within the graph (e.g., with blue representing upward movement and red representing downward movement). In the plot of FIG. 4, the upward movements are shown in solid lines, and downward movements are shown as dashed lines. It is noted that the FIG. 4 is simplified in the sense that only the most prominent features of the sensed data are shown so as not to unduly complicate the figure.

Like the plot of FIG. 3, the plot of FIG. 4 visually represents a portion of the received data created by a sensor array 102, and the plot of FIG. 4 shows two prominent features: the arrival of the upward travelling seismic waves 202 at arrival 300; and the arrival associated with the downward travelling seismic waves of the first multiple at arrival 302. Second multiples are possible. The physical relationships of the parabolic features to the sensor array discussed with the respect to FIG. 3 are equally applicable to FIG. 4, and thus will not be repeated so as not to unduly lengthen the specification.

As mentioned above, the plot of FIG. 4 shows upward velocity as solid lines, and downward velocity as dashed lines. For the example underlying data, the first arrival 300 was upward velocity (shown by solid line 404) followed by downward velocity (shown by solid line 406). In most cases the seismic waves would cause several additional changes in velocity over time, but the follow-on changes in velocity are not shown. In the example set of data plotted in FIG. 4, the first change in velocity was upward, but depending on the microseismic event, the first change in velocity could instead be downward. In the second arrival 302, the first change in velocity is also upward (shown by solid line 408) followed by downward velocity (shown by dashed line 410). Thus, for particle motion sensors, the polarity change of the sea surface reflection is counteracted by the directional sensitivity of the sensor causing equal polarity for the upward going first motion and the reversed polarity (but downward going) sea surface reflection.

The example methods involve manipulating the received data (represented by FIGS. 3 and 4) to create up-going data and down-going data. In particular, the received data are separated into up-going data and down-going data, where the up-going data are indicative of the seismic waves 202 that were upward travelling at the time of detection, and the down-going data are indicative of the seismic waves 202 that were downward traveling at the time of detection. Separating the received data into up-going data and down-going data is discussed in relation to FIGS. 3 and 4. Because of the polarity reversal observed in the pressure data (and the lack of polarity reversal of the velocity data), conceptually the data are combined in various ways to remove the unwanted components. For example, to create the up-going data the FIG. 3 data and the FIG. 4 data are summed, and because of the polarity reversal of the first multiple in the pressure data, the first multiple is cancelled in the summation (and thus leaving only the data associated with the upward traveling seismic waves). Similarly, to create the down-going data the FIG. 3 data and the FIG. 4 data are subtracted, and because of the polarity reversal of the first multiple in the pressure data, the first arrival 300 is cancelled in the subtraction (and thus leaving only the data associated with the downward traveling first multiple).

Because the hydrophone data and velocity data are different types of data, the data cannot be directly summed or subtracted. Rather, prior to separation the data are converted to the same basis. For example, the pressure data may be converted to velocity using density and the pressure wave velocity at the receiver. Conversely, the acceleration data, if used, can be converted to pressure basis by integrating to obtain the velocity, and then multiplying to convert to pressure-based data. U.S. Pat. No. 7,359,283, assigned to the same assignee as the current specification, and which is incorporated by reference herein as if reproduced in full below, discusses combing signals of pressure sensors and particle motion sensors. As will be discussed more below, both the up-going data and the down-going data are used to calculate the hypocenter, and thus the data sets represented by FIGS. 3 and 4 are not necessarily overwritten or destroyed in the process of summation and subtraction. Rather, the resultant data set of a summation may be stored in data file, and the resultant of the subtraction may be stored in a separate data file.

In accordance with example methods and systems, using both the up-going data and the down-going data, a hypocenter location is calculated. The technical problem at least partially addressed is how to more accurately calculate the hypocenter location (e.g., with sufficient accuracy to establish the extent of the stimulated reservoir volume from a hydraulic fracturing operation). That is, the technical solution presented represents improvements in the related fields of reservoir stimulation and other microseismics-based determinations regarding petroleum reservoirs. The technical solution flows from the realization that information in the first multiple (and in fact the further multiples) may be used to more precisely determine hypocenter locations. More specifically, the technical solution is implementing hypocenter calculations using both up-going data and down-going data to more accurately determine hypocenter locations (e.g., more accurate than using only up-going data). Using one or more multiples is in contrast to related-art techniques which rely only on the upward traveling seismic waves and discard information associated with the multiples when calculating hypocenter locations.

Calculating the hypocenter locations using both the up-going data and the down-going data can take many forms, but conceptually involves a four dimensional inversion in space and time. For example, calculating the hypocenter location may involve calculating a first set of locations using the up-going data, such as by use of an earthquake hypocenter location algorithm. Any suitable earthquake hypocenter location algorithm may be used to calculate the first set of locations. The first set of locations created using up-going data represent a range of possible hypocenter locations based on a range of possible times at which the microseismic event occurs. A range of possible hypocenter locations are created because the precise timing of the microseismic event is unknown. Stated otherwise, the first set of locations define an error ellipse of locations within which the hypocenter location may reside depending on the time the microseismic event occurred. Using the first set of locations, the example methods and systems then use the down-going data of the first multiple to calculate the hypocenter location using an earthquake hypocenter location algorithm. More particularly, the earthquake hypocenter location algorithm is provided the down-going data and a constraint in the form of the first set of locations. Thus, the earthquake hypocenter location algorithm selects the hypocenter location from the first set of locations with the selection based on the down-going data, ensuring that the calculated occurrence time of the event is the same.

Using the up-going data to calculate the first set of locations is merely an example. In other cases, the down-going data is used to calculate the first set of locations, and the up-going data is used in combination with the first set of data to select the hypocenter. Here again, the same or different earthquake hypocenter location algorithms may be used to calculate the first set of locations and then select the hypocenter locations from the first set of locations.

The earthquake hypocenter location algorithm may take many forms. For example, the earthquake hypocenter location algorithm may perform a reverse time regression technique, where the seismic waves are simulated as emanating from the sensor array 102 and travelling backward in time toward the hypocenter, with the hypocenter being the location(s) where the seismic waves converge. Another technique for the earthquake hypocenter location algorithm may be a "diffraction stack algorithm," where each sub-surface location is tested for the possibility of being the hypocenter. Seismic waves are simulated to emanate from each possible location and are tested against the actual received data. The hypocenter location(s) whose simulated results are most coherent with the actual received data are selected as the hypocenters for the actual microseismic event. Other techniques are also possible, and different earthquake hypocenter location algorithms may be used together (e.g., one for the up-going data, and a different one for the down-going data).

In yet still further example systems, the accuracy of the calculation may be further improved by using the second multiple. In particular, in these example systems the received data is separated into up-going data, first down-going data, and second down-going data, with the second down-going data indicative of the detected seismic waves after a second reflection from the sea surface. The separation thus creates separated data sets (e.g., here the up-going data, the first down-going data, and the second down-going data). The hypocenter location is calculated using all three members of the separated data sets. For example, a first set of locations is calculated using a first member of the separated data sets (e.g., the up-going data). A second set of locations is calculated using a second member of the separated data sets and the first set of locations (e.g., a member not used to create the first set of locations, such as the first down-going data). Then a hypocenter is selected using the third member of the separated data sets not used to create the first or second data sets, and the hypocenter selected from the second set of locations. The order of use of members of the separated data set is not limited to using the up-going-data, then using the first down-going data, and then using the second down-going data—the members may be used in any order.

Figure 5:
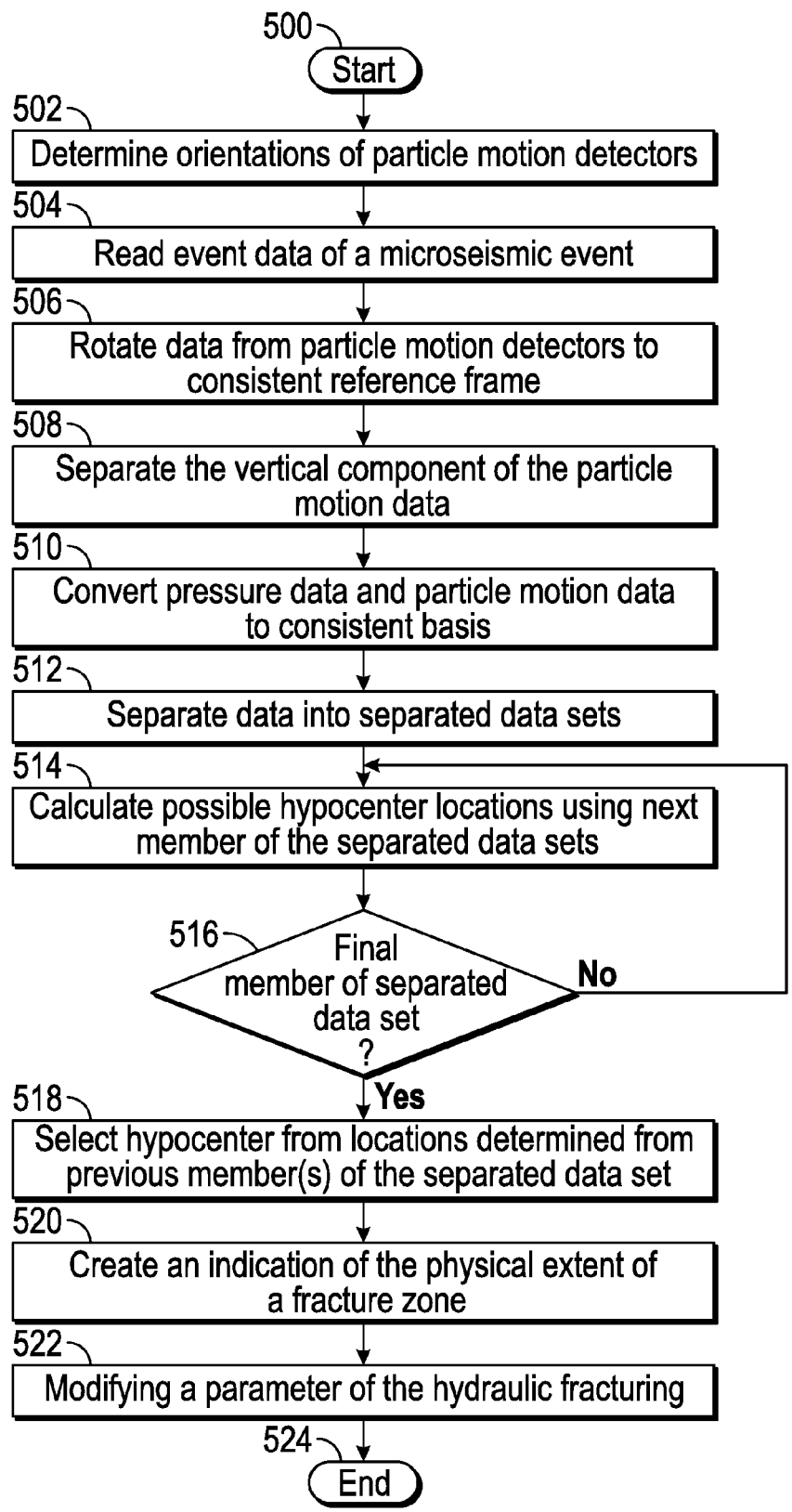
FIG. 5 shows a flow diagram in accordance with at least some embodiments.

FIG. 5 shows a flow diagram in accordance with example embodiments, some of which may be implemented in software on a computer system. In particular, the method starts (block 500) and proceeds to determining orientations of the particle motion detectors (block 502). Hydrophones measure pressure which is a scalar value, but particle motion detectors (e.g., geophones or accelerometers) read data that are directional. The seafloor 104 upon which a sensor array 102 is disposed is unlikely to be perfectly level, and thus particle motion detectors (that are not gimbaled) are unlikely to be oriented perfectly level. In order to modify received data from particle motion detectors to extract the vertical component of the motion, the orientation of each particle motion detector is measured such that coordinate transformations may be completed. Determining the orientations of the particle motion detectors may involve firing a seismic source (e.g., an air gun) at know locations over the sensor array 102. Because the location of the seismic source is precisely known for each firing, from the data received by the particle motion detectors (based on the seismic source) the orientation of each particle motion detector may be determined, and thus a transformation equation may be determined for each particle motion detector. The transformation equation may be used to mathematically "rotate" received data such that the data from each particle motion detector will be in the same reference frame (e.g., vertical aligned with gravitation, and East, West, and North aligned with convention).

Next, the example method involves reading event data of a microseismic event (block 504). For example, the sensor array 102 may read data during hydraulic fracturing of a formation, or during extraction of hydrocarbons. The event data associated with the particle motion detectors may then be mathematically "rotated" such the directional data is all with respect to a consistent reference frame (block 506). If the particle motion detectors are gimbaled such that gravity holds the particle motion detector in a consistent horizontal orientation in spite of the orientation of the sensor cable, then the mathematical "rotation" may be omitted, or limited to aligning the data to a consistent North-South and East-West orientation.

Still referring to FIG. 5, the next step in the example method is separating the vertical component of the data from the particle motion detectors (block 508). The result of the separation thus creates a data set such as visually depicted in FIG. 4. The next step in the example method is to convert the pressure data and the particle motion from the particle motion detectors to a consistent basis (block 510). As discussed above, there are several alternatives for the converting the consistent basis. For example, the pressure data may be converted to a velocity basis using density and the pressure wave velocity at the receiver.

Regardless of the basis selected to get the geophone data and particle motion data to the same basis, the next step in the example method is separating the data into separated data sets (block 512). In particular, the data is separated into up-going data, and one more sets of down-going data (e.g., a first set of down-going data for the first multiple, and a second set of down-going data for the second multiple). As discussed above, the up-going data may be created by summing the hydrophone data and particle motion data (after conversion to a consistent basis). Because of the polarity reversal of the first multiple in the pressure data, the first multiple is cancelled in the summation leaving the data associated with the upward traveling seismic waves. Similarly, to create the down-going data the hydrophone data and the particle motion data are subtracted, and because of the polarity reversal of the first multiple in the pressure data, the first arrival 300 is cancelled in the subtraction thus leaving the data associated with the first multiple. Similar mathematical exercises may result in separating and/or isolating the second and subsequent multiples if desired.

Still referring to FIG. 5, the next step in the example method is calculating possible hypocenter locations (i.e., a set of locations) using a member of the separated data sets (block 514). For example, the first iteration of the example method performs the calculation of block 514 using one member of the separated data sets (e.g., the up-going data) to create a first set of locations. As discussed above, determining a set of locations may be accomplished using any suitable earthquake hypocenter location algorithm (e.g., reverse time regression, diffraction stack algorithms). Regardless of the earthquake hypocenter location algorithm used, certain assumptions are made. For example, in simulating the propagation of the seismic waves through the overburden between the hypocenter and the seafloor, a velocity model may be used where the velocity model assumes velocities of sound through the particular layers of overburden. In simulating the propagation through the water (e.g., when using the first or subsequent multiples), a velocity profile through water may be used, including a velocity profile that accounts for differences in velocity of sound based on salinity and depth. The earthquake hypocenter location algorithm may account directly for the reflection at the sea surface, or the model may assume a mirrored profile of the velocity model with the sensor array conceptually placed a distance above the sea surface equal to the depth of the actual sensor array disposed on the seafloor.

In the first iteration of the example calculation step (again block 514), the result of the calculation is not constrained, and thus the result is a set of locations where the hypocenter may reside (e.g., an error ellipse). Next, a determination is made as to whether the final member of the separated data sets remains (block 516). If the final member of the separated data sets has not been reached, the example method returns to calculating possible hypocenter locations (again block 514), the calculating with a next member of the separated data sets. In the second and subsequent iterations through the calculation step, the resultant possible hypocenter locations (i.e., the next set of locations) is constrained by the result of the previous iteration of the calculating with the previous member of the separated data sets. For example, if in the second iteration of block 514 the first down-going data set is used, the set of locations from the previous iteration (e.g., the set of locations based on the up-going data) is used as a constraint supplied to the earthquake hypocenter location algorithm. The iterative process continues until only one member of the separated data sets remains (again block 516).

Still referring to FIG. 5, when the last unused member of the separated data sets remains, the example method proceeds to selecting a hypocenter from the set of locations from the previous iteration of the calculating step (block 516), keeping in mind that each iteration decreases the error (e.g., decreases the size of the error ellipse). The method performed at illustrative block 518 may be similar to the method performed at block 514, with the exception that a single hypocenter location may be selected.

The resultant hypocenter location may be used in many ways. For example, multiple hypocenter locations may be determined over time, such as during periods of time when hydraulic fracturing of the formation below the sensor array is taking place. The hypocenter locations as a group may thus indicate the physical extent of the fracture zone, and thus in some example systems the illustrative method may create an indication of the physical extent of the fracture zone created by the hydraulic fracturing (block 520). In yet still other example systems, once the indication of the physical extent of the fracture zone is known, actions may be taken based on the knowledge. For example, a parameter of the hydraulic fracturing operation (e.g., pressure applied, volume of fluids pumped downhole, time length that the pressure is applied) may be modified (block 522) based on the indication of physical extent of the fracture zone. Thereafter, the method may end (block 524), in many cases to be immediately restarted.

Figure 6:
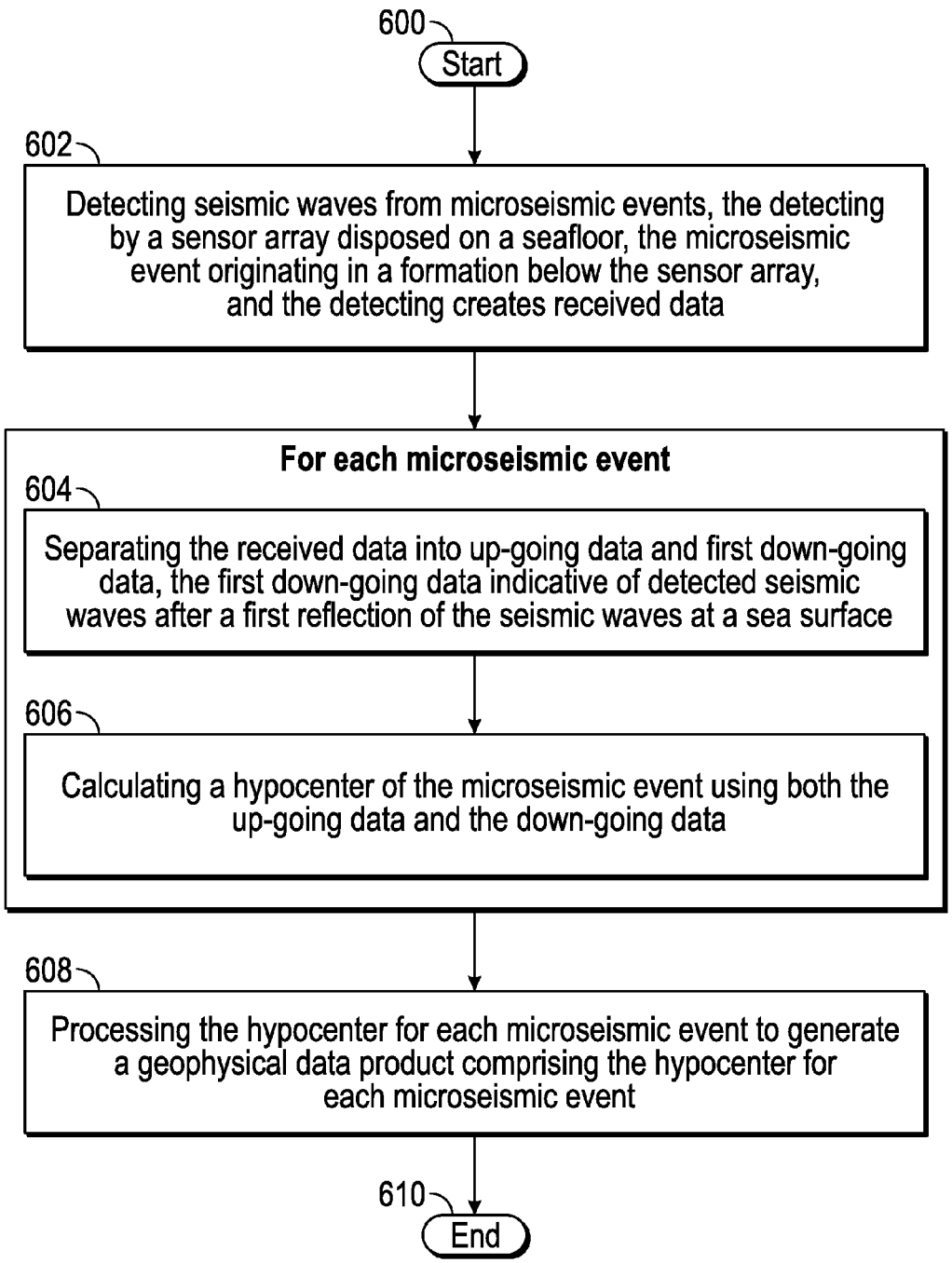
FIG. 6 shows a method in accordance with at least some embodiments.

In accordance with an example system, a geophysical data product may be produced. The geophysical data product may include one or more hypocenter locations determined using the method described above, including use of at least one multiple in the determination. The geophysical data product may be stored on a non-transitory, tangible computer-readable medium. The geophysical data product may be produced offshore (e.g., by equipment on a vessel) or onshore (e.g., at a facility on land) either within the United States or in another country. If the geophysical data product is produced offshore or in another country, it may be imported onshore to a facility, for example, in the United States. Once onshore in, for example the United States, geophysical analysis may be performed on the geophysical data product. In that vein, FIG. 6 shows a method in accordance with yet still further example methods. In particular, the method starts (block 600) and proceeds to detecting seismic waves from microseismic events, the detecting by a sensor array disposed on a seafloor, the microseismic event originating in a formation below the sensor array, and the detecting creates received data (block 602). For each microseismic event, the example method includes: separating the received data into up-going data and first down-going data, the first down-going data indicative of detected seismic waves after a first reflection of the seismic waves at a sea surface (block 604); and calculating a hypocenter of the microseismic event using both the up-going data and the down-going data (block 606). Thereafter, the example method may include processing the hypocenter for each microseismic to generate a geophysical data product comprising the hypocenter for each microseismic event (block 608). Thereafter, the method ends (block 610).

Figure 7:
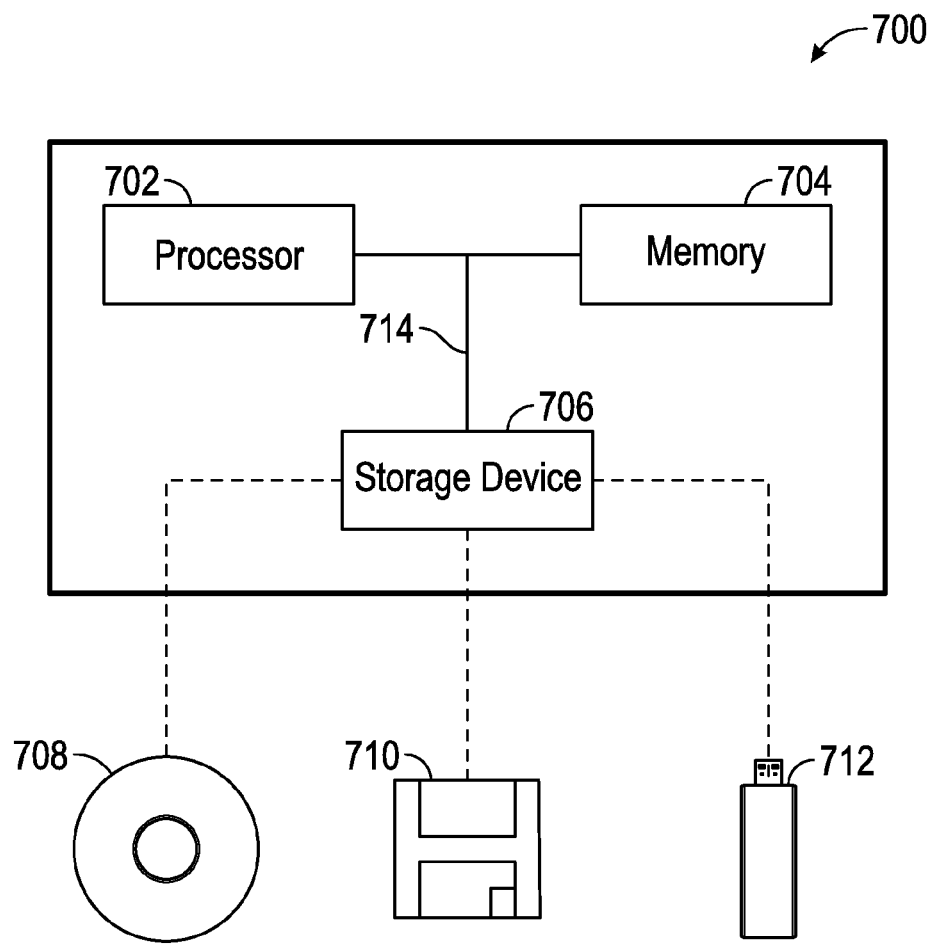
FIG. 7 shows a computer system in accordance with at least some embodiments.

FIG. 7 shows a computer system 700 in accordance with at least some embodiments. The computer system 700 is an example of: a computer system upon which portions of the example methods discussed could be performed; a computer system that forms a part or all of the systems described; or a computer system that creates the geophysical data product. The example computer system 700 comprises a processor 702 coupled to a memory 704 and a storage system or long term storage device 706. The processor 702 may be any currently available or after-developed processor, or group of processors. The memory 704 may be random access memory (RAM) which forms the working memory for the processor 702. In some cases, data and programs may be copied from the storage device 706 to the memory 704 as part of the operation of the computer system 700.

The long term storage device 706 is a device or devices that implement non-volatile long-term storage, which may also be referred to as a non-transitory computer-readable media. In some cases, the long term storage device is a hard drive or solid state drive, but other examples include optical discs 708, "floppy" disks 710, and flash memory devices 712. The various programs used to implement the programmatic aspects may thus be stored on the long term storage device 706, and executed by the processor 702. Relatedly, the hypocenter location(s) may be calculated by the processor 702 and communicated to the storage device 706 (including the example optical disc 708, floppy disk 710, or flash memory device 712) by way of a telemetry channel 714 to become a geophysical data product.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
hydraulic fracturing a portion of a formation below a sensor array;
detecting seismic waves from a microseismic event simultaneously with the hydraulic fracturing, the detecting by the sensor array disposed on a seafloor, each sensor of the sensor array having a hydrophone and a particle motion detector, the microseismic event originating in the formation below the sensor array, and the detecting creates received data;
separating, by a computer system, the received data into first data and second data, the first data representative of seismic waves that were traveling in a first direction when detected by the sensor array, and the second data representative of seismic waves that were traveling in a second direction different from the first direction when detected by the sensor array;
calculating, by a computer system, a first set of locations, the calculating using the first data;
selecting, by a computer system, a hypocenter of the microseismic event, the hypocenter selected from the first set of locations using the second data; and
modifying a parameter of the hydraulic fracturing based on the hypocenter of the microseismic event;
wherein the hypocenter selected based on both the first data and the second data provides a more accurate hypocenter than using the first data alone.

2. The method of claim 1:
wherein the first data is first up-going data, and the second data is first down-going data;

wherein calculating the first set of locations further comprises calculating the first set of the locations using the first up-going data; and wherein selecting the hypocenter of the microseismic event further comprises selecting the hypocenter from the first set of locations based on the first down-going data.

3. The method of claim 2:

wherein the first data is first up-going data, and the second data is first down-going data;

wherein calculating the first set of locations further comprises calculating the first set of the locations using the up-going data and a time at which microseismic event occurred; and wherein selecting the hypocenter further comprises selecting the hypocenter based on the first down-going data and the time at which the microseismic event occurred, the hypocenter selected from the first set of locations.

4. The method of claim 1:

wherein the first data is first down-going data, and the second data is first up-going data;

wherein calculating the first set of locations further comprises calculating the first set of the locations using the first down-going data; and wherein selecting the hypocenter of the microseismic event further comprises selecting the hypocenter from the first set of locations based on the first up-going data.

5. The method of claim 1 further comprising:

creating, by a computer system, an indication of a physical extent of a fracture zone created by the hydraulic fracturing, the indication based on the hypocenter.

6. The method of claim 5 further comprising wherein modifying the parameter of the hydraulic fracturing further comprises modifying based on the indication of physical extent of the fracture zone.

7. A method comprising:

hydraulic fracturing a portion of a formation below a sensor array;

detecting seismic waves from a microseismic event simultaneously with the hydraulic fracturing, the detecting by the sensor array disposed on a seafloor, each sensor of the sensor array having a hydrophone and a particle motion detector, the microseismic event originating in the formation below the sensor array, and the detecting creates received data;

separating, by a computer system, the received data into separated data sets comprising up-going data, first down-going data, and second down-going data, the up-going data representative of seismic waves that were traveling upward when detected by the sensor array, the first down-going data representative of seismic waves detected after a first reflection of the seismic waves at a sea surface, and the second down-going data representative of seismic waves detected after a second reflection of the seismic waves at the sea surface;

calculating, by a computer system, a first set of locations, the calculating the first set of locations using a first member of the separated data sets;

calculating, by a computer system, a second set of locations, the calculating the second set of locations using a second member of the separated data sets not used to create the first set of locations, and the second set of locations selected from the first set of locations;

selecting, by a computer system, a hypocenter, the selecting the hypocenter using a third member of the separated data sets not used to create the first or second set of locations, and the hypocenter selected from the second set of locations; and modifying a parameter of the hydraulic fracturing based on the hypocenter of the microseismic event;

wherein the hypocenter selected is more accurate than using the up-going data alone.

8. A method comprising:

hydraulic fracturing a portion of a formation below a sensor array disposed on the seafloor;

detecting seismic waves from a microseismic event, the detecting by the sensor array, each sensor of the sensor array having a hydrophone and a particle motion detector, the microseismic event originating in a formation below the sensor array, and the detecting creates received data;

separating, by a computer system, the received data into first data and second data, the first is representative of seismic waves that were traveling in a first direction when detected by the sensor array, and the second data is representative of seismic waves that were traveling in a second direction different from the first direction when detected by the sensor array;

determining, by a computer system, a hypocenter of the microseismic event; and modifying a parameter of the hydraulic fracturing based on the hypocenter of the microseismic event; wherein an improvement to the determining the hypocenter comprises:

calculating a first set of locations, the calculating using the first data; and then selecting, by a computer system, the hypocenter of the microseismic event from the first set of locations using the second data;

thereby enhancing accuracy of determining a location of the hypocenter.

9. The method of claim 8:

wherein the first data is first up-going data, and the second data is first down-going data;

wherein calculating the first set of locations further comprises calculating the first set of the locations using the first up-going data; and wherein selecting the hypocenter further comprises selecting the hypocenter from the first set of locations using the first down-going data.

10. The method of claim 8:

wherein the first data is first down-going data, and the second data is first up-going data;

wherein calculating the first set of locations further comprises calculating the first set of the locations using the first down-going data; and wherein selecting the hypocenter further comprises selecting the hypocenter from the first set of locations using the first up-going data.

11. The method of claim 8 further comprising:

wherein the hydraulic fracturing occurs simultaneously with the detecting seismic waves; and creating, by a computer system, an indication of a physical extent of a fracture zone created by the hydraulic fracturing, the indication based on the hypocenter.

12. A method comprising:

hydraulic fracturing a portion of a formation below a sensor array;

detecting seismic waves from a microseismic event, the detecting by the sensor array disposed on a seafloor, each sensor of the sensor array having a hydrophone and a particle motion detector, the microseismic event originating in the formation below the sensor array, and the detecting creates received data;

separating, by a computer system, the received data into first data and second data, the first data representative of seismic waves that were traveling in a first direction when detected by the sensor array, and the second data representative of seismic waves that were traveling in a second direction different from the first direction when detected by the sensor array;

calculating, by a computer system, a first set of locations, the calculating using the first data;

selecting, by a computer system, a hypocenter of the microseismic event, the hypocenter selected from the first set of locations using the second data; and modifying a parameter of the hydraulic fracturing based on the hypocenter of the microseismic event;

wherein the hypocenter selected based on both the first data and the second data provides a more accurate hypocenter than using the first data alone.

13. A computer-implemented method comprising:

detecting seismic waves from a microseismic event, the detecting by a sensor array disposed on a seafloor, each sensor of the sensor array having a hydrophone and a particle motion detector, the microseismic event originating in a formation below the sensor array, and the detecting creates received data;

separating, by a computer system, the received data into first data and second data, the first data is upgoing data representative of seismic waves that were traveling in an upward direction when detected by the sensor array, and the second data is downgoing data representative of seismic waves that were traveling in a downward direction when detected by the sensor array;

calculating, by a computer system, a first set of locations using the upgoing data; and then selecting, by a computer system, a hypocenter of the microseismic event using the downgoing data, the hypocenter selected from the first set of locations;

wherein the hypocenter selected based on both the first data and the second data provides a more accurate hypocenter than using the first data alone.

14. The computer-implemented method of claim 13 wherein the detecting further comprises detecting seismic waves caused by hydraulic fracturing of the formation below the sea floor.

15. The computer-implemented method of claim 14, further comprising:

wherein the hydraulic fracturing occurs simultaneously with the detecting seismic waves; and creating, by a computer system, an indication of a physical extent of a fracture zone created by the hydraulic fracturing, the indication based on the hypocenter.

* * * * *